Patented June 17, 1941

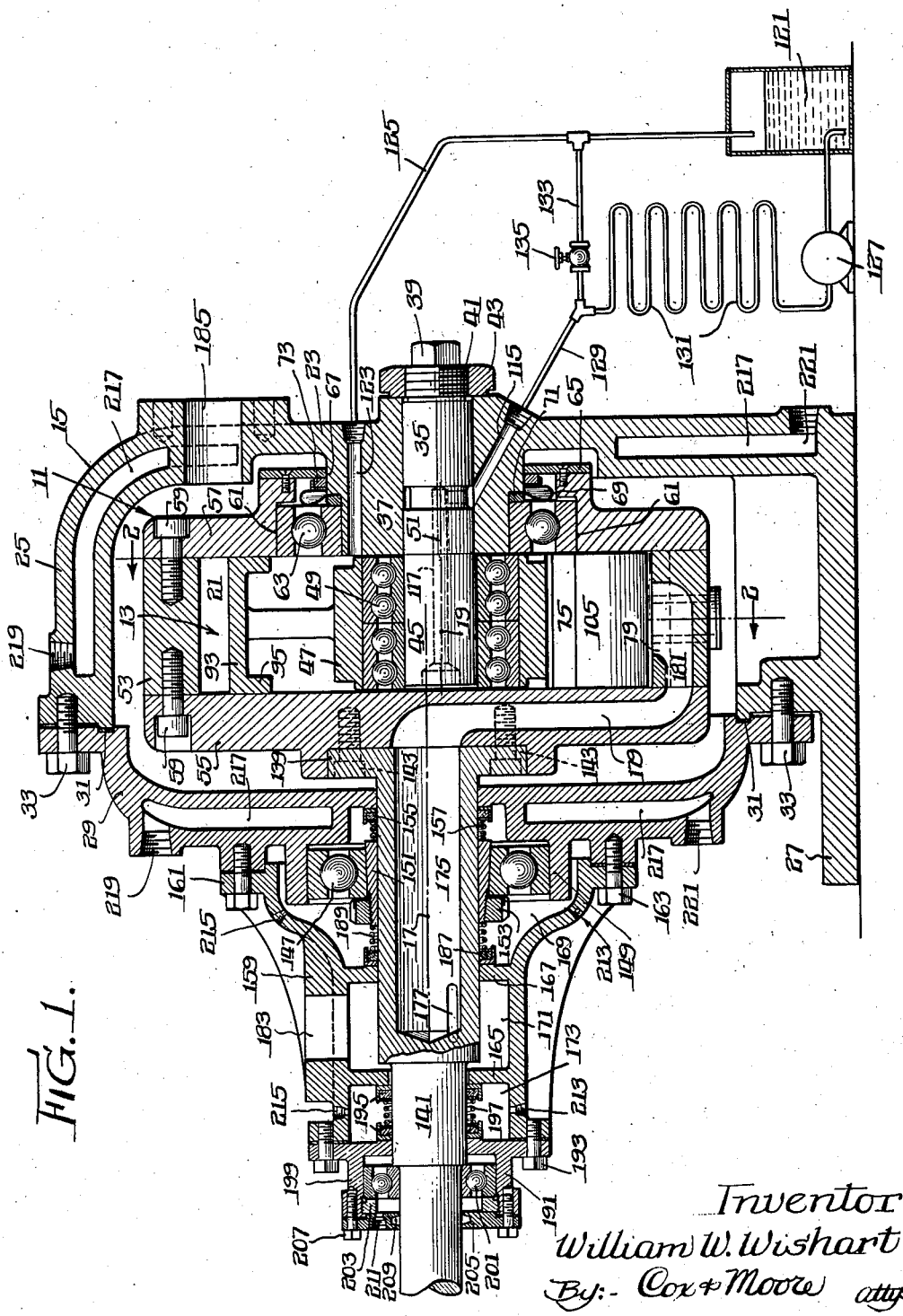

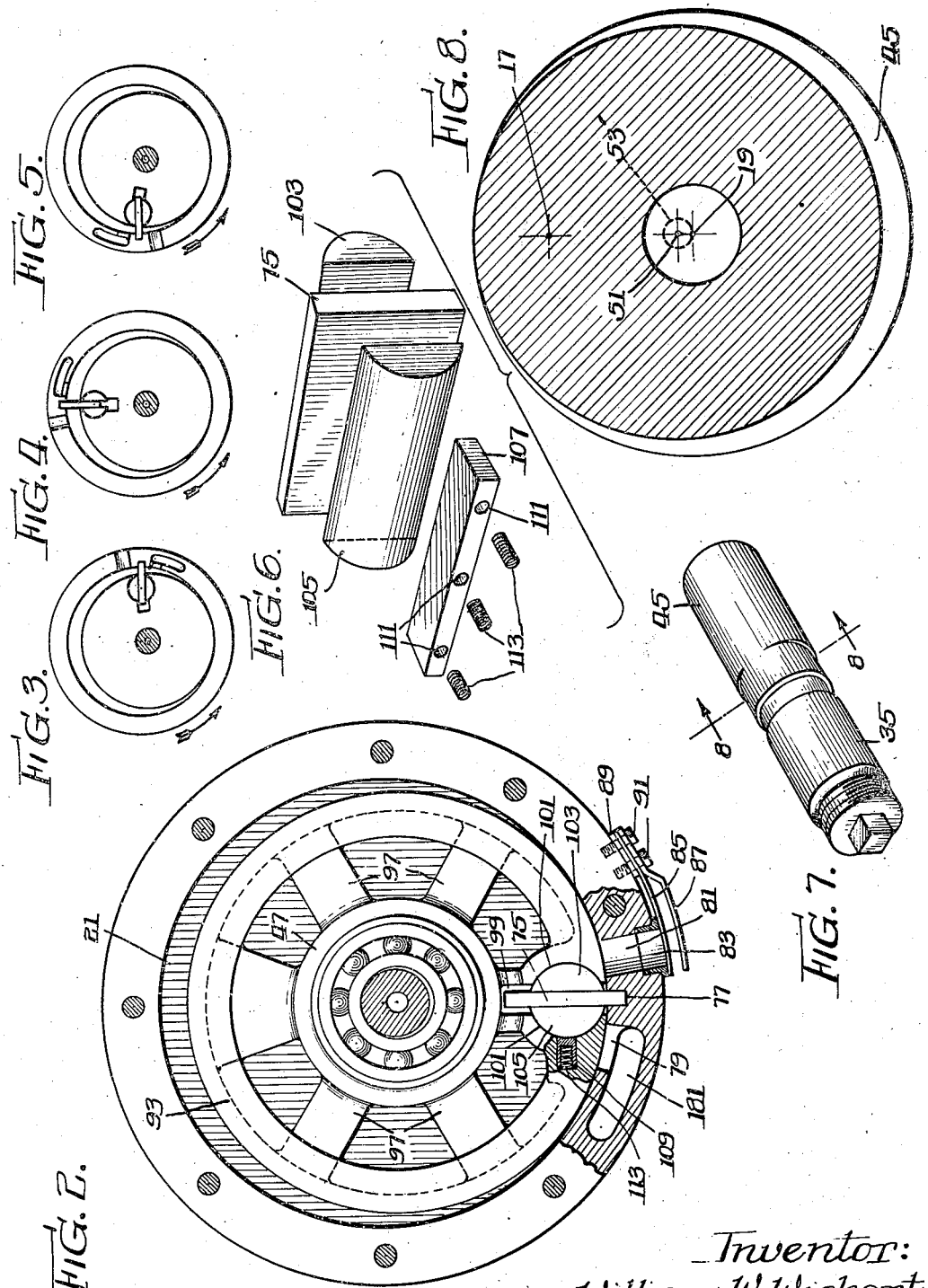

2,246,279

UNITED STATES PATENT OFFICE 2,246,279

COMPRESSOR

William W. Wishart, Chicago, Ill., assignor Davidson Manufacturing Corporation, Chicago, Ill., a corporation of Illinois Application June 26, 1935, Serial No. 28,478

2 Claims. (Cl. 230—205)

My invention relates in general to fluid pressure devices and has more particular reference to a rotary apparatus for use in the compression of fluid work media.

An important object of the invention is to provide a fluid pressure device having improved means for sealing the device against fluid leakage of the medium being compressed; a further important object being to utilize a lubricant, delivered into the apparatus under pressure greater than that produced in the work medium, in order to seal the device against fluid leakage between the high and low pressure sides of the device.

Another important object is to provide a fluid flow device having facilities for lubricating the operating parts, including an arrangement whereby a medium, used in the lubrication of the operating parts, is applied in a manner to assist in sealing the device against leakage of the fluid between the inlet and outlet sides of the device.

Another important object is to utilize a lubricating medium at a pressure in excess of that developed in the work medium in order to adequately seal the fluid pressure device and thus maintain it at maximum operating efficiency.

Another important object resides in circulating a lubricating medium internally and externally of the device and cooling the medium during its external flow to the end that the medium may function to transfer heat from the pressure device and maintain the same at a low operating temperature to promote operating efficiency.

Another important object resides in the provision of means to regulate the pressure at which the lubricating medium is delivered to the pressure device for the purpose of lubricating and sealing the same.

Among the other important objects is to jacket the housing of the compressor with a cooling medium to thus assist in maintaining the device at a low operating temperature; to provide one of the working elements with a blade rigidly fixed thereon and having bearing relationship with the other element in order to form an efficient fluid forcing connection between the elements, including means to deliver lubricant under pressure between the blade and the working element on which it has bearing; to mount the piston for rotation on a shaft extending within the cylinder and to deliver the lubricating and sealing medium to the interior of the piston through a duct formed in the shaft; to form the cylinder as an annular ring held between end plates, at least one of which carries an axle by means of which the cylinder may be supported for rotation; to provide an inlet to said cylinder comprising an axial duct in said shaft and a communicating radial duct in said end plate; to form the axial duct with an opening disposed circumferentially in the axle and to enclose, in a sealed housing, that portion of the axle having the circumferential opening; to provide a piston carrying shaft with a supported portion eccentric to the piston carrying portion thereof to permit adjustment of the eccentricity of the piston with respect to the rotary axis of the cylinder by merely turning the shaft.

Numerous other objects, advantages, and inherent functions of the invention will be apparent from the following description, which, taken in connection with the accompanying drawings, discloses a preferred embodiment of the invention.

Referring to the drawings:

Figure 1 is a longitudinal section taken through a compressor embodying my invention, the associated lubricant cooling and forcing equipment being shown diagrammatically.

Figure 2 is a sectional view taken substantially along the line 2—2 in Figure 1.

Figures 3, 4, and 5 are sectional views, on a reduced scale, illustrating the progressive positions of the parts during the operating cycle of the machine.

Figure 6 is an exploded view, in perspective, of parts forming the driving connection between the piston and cylinder.

Figure 7 is a perspective view of the shaft on which the piston is carried.

Figure 8 is a sectional view taken substantially along the line 8—8 in Figure 7.

To illustrate my invention, I have shown, on the drawings, a fluid pressure device comprising a rotary machine designed to function as a fluid compressor, although it will be obvious that many of the features of the invention may have general application in any type of fluid flow apparatus.

My invention particularly contemplates the sealing of compression or other fluid flow apparatus in order to prevent the leakage or escape of the work medium during its travel through the apparatus from the inlet to the discharge. Leakage of this character is particularly deleterious in rotary compressors, in which loss of efficiency may be occasioned by leakage of the compressed medium from the high pressure or discharge side to the low pressure or inlet side. I propose to overcome this difficulty by supplying, at the places where leakage is apt to occur, a fluid sealing medium, which may also conveniently provide for lubrication of the operating parts, the sealing medium being applied under pressure in excess of the high pressure causing the leakage. To provide the foregoing sealing effect, I utilize several novel structural arrangements adapted to assist in preventing fluid leakage of the work medium in devices of the character here treated.

The compressor, which I have shown on the drawings to illustrate the various features of my present invention, comprises a pair of co-operating parts, namely, a cylinder element 11 and a piston element 13, which are mounted for relative movement in order to accomplish the fluid forcing or compressing function of the device. The cylinder and piston are mounted in a frame or casing 15 and are preferably both mounted for rotation about relatively eccentric parallel axes, the cylinder element being mounted for rotation about an axis 17, while the piston is mounted for rotation about an axis 19. The axis 19 of the piston is displaced from that of the cylinder by a predetermined distance so that the piston engages the inner surface of the cylinder along a line lying in a plane common to the axes 17 and 19 and, since the inner diameter of the cylinder is larger than the external diameter of the piston, a crescent-shaped working space 21 is defined between the working parts.

The frame or casing 15, provides a closed housing in which the cylinder and piston are mounted. The casing may, of course, have any suitable form or construction but the same preferably comprises a pair of co-operating parts, one of which forms a cup-shaped element having an end wall 23, preferably cylindrical side walls 25, and an integral base 27. The other casing part preferably comprises a cover 29, the circular edges of which are adapted to engage and fit upon the edges of the cylindrical walls 25 opposite the end wall 23. The walls 25 and the marginal edge of the cover 29 are preferably formed, as at 31, with an inter-fitting tongue and groove formation, and the parts may be secured together in any desired fashion, as by means of the studs or bolts 33, in order to form an enclosed casing in which the cylinder and piston 13 are mounted.

The piston is mounted for rotation upon a preferably stationary stub shaft, preferably formed as shown in Figure 7, said stub shaft having a portion 35 carried in a sleeve-like support 37 comprising a part of the end wall 23 of the casing. The shaft portion 35 has an end extending outwardly of the wall 23 and squared or otherwise formed, as at 39, to receive a turning implement by means of which the angular position of the shaft 35, within the sleeve-like supporting portion 37, may be adjusted from outside of the casing. To anchor the shaft portion 35 in adjusted position, its outwardly extending portion may be threaded, as at 41, to receive a holding nut 43. The stub shaft has a piston-carrying portion 45 formed at the inner end of the portion 35, said portion 45 being preferably cylindrical and projecting within the cylinder in position to carry the piston 13. The piston comprises a central sleeve 47 rotatably mounted on the shaft portion 45 by means of anti-friction bearings 49. The shaft portion 45 thus defines the axis 19 about which the piston rotates.

I prefer to form the stub shaft so that the axis 19 is offset a short distance, of the order of a few thousandths of an inch, from the axis 51 of the supported shaft portion 35, so that, by turning the shaft portion 35 in its supporting bearing, the axis 19 of the shaft supporting portion 45 may be made to describe a circular path, indicated by the line 53' in Figure 8 of the drawings. In this way, the relative position of the axis 19 may be adjusted to any position on the path 53' in order to adjust the relative eccentricity of the axes 17 and 19. By this expedient, the necessity of accurately positioning the axis 17 in the frame is obviated and any manufacturing error made in locating the cylinder bearings may be compensated for by merely turning the shaft portion 35, after the parts have been assembled, in order to bring the operating surfaces of the cylinder and piston into rolling contact. This adjustment also provides a means for quickly and accurately compensating for any wear that may occur in the piston and cylinder bearings during operation of the device.

The cylinder means 11 preferably comprises an annular ring 53 and a pair of end plates 55 and 57, the end plates being clampingly secured in position covering the opposite sides or ends of the ring 53 in any suitable fashion, preferably by means of studs 59. The end plate 57 has a central opening 61 adapted to receive the sleeve-like portion 37 of the frame and said end plate is supported for rotation on the portion 37 preferably by means of an anti-friction bearing 63. I also provide a seal for closing the central opening of the end plate preferably outwardly of the bearing 63. The seal comprises a disk 65 secured on the end plate 57 and having a central opening defining an inner edge 67 having a running fit upon the sleeve-like portion 37. The bearing 63 serves to hold a resilient sealing member 69 against a shoulder 71 formed on the sleeve-like support portion 37, said sealing element 69 carrying a sealing washer 73 in position to engage the disk 65 in order to form a running seal therewith and prevent fluid passage between the interior of the cylinder and the surrounding space within the housing 15 through the central opening of the end plate 57.

The cylinder carries a blade 75, one edge of which is fitted tightly in a slot 77 formed in the ring 53. The opposite side edges of the blade engage the opposed inwardly facing surfaces of the end plates 55 and 57, so that the blade is clamped between the end plates and extends radially inwardly of the ring 53. The cylinder has an inlet 79 comprising an orifice opening on the inner surface of the ring 53 on one side of the blade 75. The cylinder is also provided with an outlet 81, comprising a channel extending preferably through the ring 53 from its inner to its outer surface, said channel opening on the inner surface of the ring on the side of the blade 75 opposite from the inlet 79. I also preferably provide outwardly opening valve means in the outlet 81, said valve means comprising a seat 83 set in the outlet opening and normally covered by a resilient blade 85, which, together with a guard 87 for limiting the valve opening movement of the spring away from the seat 83, is fastened on a boss 89 formed on the outer surface of the ring 53 in any suitable fashion as by the fastening screws 91.

The piston 13 comprises an annular portion 93 of a width forming a snug sliding fit between the end plates 55 and 57 of the cylinder. The marginal edges of this annular portion are preferably flanged as at 95 to provide an adequate bearing surface in engagement with the end plates 55 and 57. The annular portion 93 also is secured on the hub 47 preferably by means of integral legs 97. One of these legs extends entirely across the piston and is formed with a slot 99 adapted to receive the blade 75, the opposite sides of the slot forming semi-cylindrical seats 101, in which are received semi-cylindrical bearing blocks 103 and 105, the flat surfaces of which are formed to slidingly engage upon the opposed surfaces of the blade 75. The parts are designed to rotate in a counter-clockwise direction, viewing Figures 2, 3, 4, and 5 and it will be seen that, when the cylinder is rotated, the piston will be driven by the interaction of the blade 75 upon the leading block 103 which drives the piston by virtue of its bearing in the seat 101. As the parts rotate from the position shown in Figure 2, it will be seen, from an inspection of Figures 3, 4, and 5, that the blade 75 will traverse the crescent-shaped space 21 so that the work space, in communication with the inlet 79, will increase in size from zero to a maximum during one rotation of the blade, while the space, in communication with the outlet, will decrease from a maximum to zero. As a result of this operation, the space behind the blade will become charged with the work medium, which is drawn into the space behind the blade through the inlet 79 during a complete rotation of the parts. The work medium thus drawn into the work space will be forced out of the space from in front of the blade during the succeeding rotation of the elements. During the loading of the space behind the blade with the work medium at inlet pressure, the work medium in the work space in front of the blade, which was drawn into the cylinder during the preceding rotation of the elements, will be compressed and forced from the cylinder through the valved outlet 81. It will be seen also that maximum pressure in the work medium will be developed in the work space in front of the blade during travel of the blade from the position shown in Figure 4, through the position shown in Figure 5, to the position shown in Figure 2, since this is the part of the operating cycle during which the work medium receives its greatest compression. It will be noted that the work medium is expelled through the outlet 81 into the chamber provided by the housing 25. As a result of continued operation of the device, this chamber becomes filled with the work medium at discharge pressure and this chamber, together with the portions of the work space, in which compression is accomplished, constitutes the high side of the machine. The low side of the machine comprises the inlet 79, the inlet ducts communicating therewith, and which will hereinafter be more fully described, as well as the work space 21 during that portion of the operating cycle when the same contains gases at inlet pressures.

Fluid leakage, from the high side, may occur within the cylinder during the compression portion of the operating cycle, that is to say, when the parts reach the position shown in Figure 4 and during the travel of the parts through the position shown in Figure 5 to the position shown in Figure 2; and there will be an increasing tendency for the compressed work medium to escape from the working space in front of the blade 75 to the working space behind said blade. The compressed medium tends to escape around the blade 75, as well as between the ends of the piston and the side plates 55 and 57. Leakage also tends to occur between the cylindrical surfaces of the piston and cylinder at their point of contact. Leakage between the cylindrical surfaces of the working element at their point of contact is reduced to a minimum by means of the adjustment provided by the piston-supporting shaft. By this adjustment, the rolling contact of the piston and cylinder is made absolute so that leakage, at the point of rolling contact, is substantially eliminated. Leakage past the side edges of the blade 75 is prevented by the clamping engagement of the end plates 55 and 57 upon said edges of the blade. If necessary, the opposed edges of the blade may be countersunk within the end plates 55 and 57. Leakage between the blade 75 and the ring 53 is prevented by the construction wherein the outer edge of the blade is sealingly fitted tightly in the groove 77. Leakage around the inner edge of the blade, through the slot 99, is prevented by the fact that the leading block 103 is compressed between the blade 75 and the seat 101 as a result of driving pressure exerted between the blade, the block, and the seat. Leakage past the trailing block 105 is prevented by means of a preferably spring-pressed element 107 comprising a blade housed in a socket 109 formed in the piston behind the trailing block 105, in such a position that an edge of the element 107 presses upon the back of the block 105 and urges its flat surface into snug engagement with the trailing face of the blade 75. The blade 107 is provided with sockets 111 in its remote edge and springs 113 are mounted in the sockets in position to urge the blade 107 outwardly of the slot 109.

In addition to the foregoing structural features for preventing fluid leakage from the high side of the compressor, I provide for introducing in the slot 99, between the contacting surfaces of the blade and bearing blocks and also between the contacting end surfaces of the piston and the end plates 55 and 57, a fluid sealing medium, which medium preferably comprises a suitable lubricating oil and is introduced at a pressure in excess of the maximum pressure in the work medium.

Any suitable or convenient means may, of course, be utilized to accomplish the application of the sealing medium at the places where leakage is likely to occur. I prefer, however, to apply the lubricating and sealing medium through a channel 115 formed in the sleeve-like portion of the end wall 23, said duct 115 opening in the journal carrying the shaft 35. The inner end of the duct 115 communicates with an axial channel 117 formed in the piston-carrying shaft, said channel 117 in turn opening at the inner end of the shaft portion 45 so that the lubricating and sealing medium, introduced through the duct 115, may escape at the inner end of the piston-carrying shaft and penetrate into the bearings 49 and into the space between the hub 47 and the peripheral portion 93 of the piston and also into the slot 99, which receives the blade 75.

The lubricating medium, heretofore mentioned, is introduced at a pressure in excess of the maximum pressure occurring in the work medium, but I prefer to maintain the pressure of the sealing medium at approximately five to ten percent greater than the maximum pressure in the work medium, since I find that an undue excess in lubricant pressure results in substantial leakage of the sealing medium into the work space 21 during the periods when the work medium is in the work space at inlet pressure. Undue leakage of the sealing medium in this fashion impairs the efficiency of the device. I find that a sealing medium applied in the foregoing manner, at a pressure of the order of five to ten percent greater than the maximum pressure occurring in the work medium, effectively seals the machine against high pressure leakage. The exact pressure to be maintained in order to promote the maximum efficiency may vary within the indicated limits and the same results may be obtained by adjusting the oil pressure with respect to the discharge pressure at which the compressor is operating in order to maintain the oil within the indicated limits. For convenience, the lubricant pressure control may be set to deliver oil at an excess pressure of five pounds if the compressor is discharging at a pressure between 50 and 100 pounds per square inch, the oil pressure control mechanism being set to deliver ten pounds excess oil pressure if the compressor is in operation to deliver the work medium at a pressure between 100 and 200 pounds per square inch. The oil pressure control mechanism may be set to deliver oil at twenty pounds excess pressure when the compressor is operated at a discharge pressure of over 200 pounds. These figures are, of course, strictly empirical but serve to define the approximate relationship between excess oil pressure and delivery pressure for maximum efficiency.

The sealing effect, thus accomplished, is better than is accomplished where the sealing medium is introduced at a pressure equal to or less than the maximum pressure in the work medium; in fact, I find that, where the sealing medium is introduced at a pressure equal to or slightly less than the maximum pressure developed in the work medium, the sealing effect is little, if any, better than that accomplished by the normal fit of the parts supplied with an adequate lubrication. In other words, the application of the sealing medium at a pressure greater than the maximum pressure in the work medium provides an unusual and unexpected beneficial sealing effect and permits the provision of devices of unusual efficiency and capacity.

In rotary compressors, embodying this feature, I have been able to develop amazing pressures considerably in excess of two hundred pounds with a machine operating at full capacity of 8.5 cubic feet with barely noticeable decrease in overall efficiency. I have also been able to operate the device as an exhaust pump of corresponding efficiency and performance.

I prefer to operate the machine at as high a rate of speed as possible, since leakage of the sealing medium in the work space is a function of speed, it being obvious that more oil will leak between the contacting surfaces of the rotor and the end plates at low speed than at high speed.

I prefer to cause the sealing and lubricating medium to circulate within the piston and cylinder in order that the same may lubricate the bearings 49 and 63 as well as all of the operating parts of the mechanism. I also prefer to apply the sealing and lubricating medium from an external source comprising a reservoir 121, although, of course, the lubricant may be circulated, if desired, from a source and by means of instrumentalities contained within the casing 15.

In any event, suitable conduit means, comprising, in the illustrated embodiment, a return duct 123 and a duct 125, is provided for returning the lubricating medium from within the cylinder to the reservoir 121. A pump 127, which may be incorporated in the compressor, if desired, or formed separately, as shown, is utilized to draw the lubricating and sealing medium from the reservoir 121 and deliver the same, as through a pipe 129, at a desired pressure into the inlet ducts 115 and 117. The compressed sealing medium also is preferably cooled by passage through cooling coils 131 during its travel from the pump 127 to the inlet ducts 115. By thus cooling the circulating lubricating and sealing medium, I am able to abstract, from the compressor, a considerable amount of the heat of compression of the work medium and thus maintain the apparatus at an efficient, relatively low operating temperature.

To control the pressure, at which the lubricating medium is introduced into the cylinder 11 and the piston 13, I may provide a by-pass connection 133 between the inlet and outlet conduits 125 and 129. This connection includes a control valve 135, which, when fully open, permits the pump 127 to by-pass the sealing and lubricating medium directly to the reservoir 121 so that substantially none of the sealing medium will be delivered through the ducts 115 and 117 to the operating parts of the compressor. As the valve 135 is closed, the pressure and volume of the sealing medium, delivered to the compressor, will increase to the maximum delivery pressure of the pump 127 when the valve 135 is completely closed.

As heretofore described, the cylinder is rotatably supported by its end plate 57 on the sleeve-like casing portion 37. The other end plate 55 of the cylinder is also rotatingly mounted on the frame or casing, said end plate carrying a shaft 141 extending outwardly thereof in axial alignment with the axle of the cylinder. To this end, the end plate 55 is preferably formed with a seat 137 adapted to receive a flanged end 139 of the shaft 141, said flanged end being fastened in place in the seat in any suitable fashion and preferably by means of the fastening studs 143. The shaft 141, therefore, defines the axis 17, about which the cylinder is designed to rotate. The shaft 141 is supported by the cover 29 of the casing, said shaft extending through an opening 145 in the cover and being journalled in a suitable, preferably anti-friction, bearing 147, which is carried in a seat 149 formed in the outer surface of the cover 29. The shaft also preferably carries a tapered sleeve 151 press fitted thereon to receive the correspondingly tapered race of the anti-friction bearing, which is retained in position by means of a nut 153 threaded upon the tapered sleeve 151. An annular seal ring 155 is also provided and encircles the shaft, seating upon the cover 29 at the opening 145 to aid in preventing the escape of the compressed work medium from within the casing 15 along the shaft 75, the seal ring 155 being yieldingly urged to seating position by means of a spring 157, which also encircles the shaft and extends between the seal ring and the facing end of the sleeve 151.

The bearing 147 is enclosed in a cover element 159 of generally cylindrical configuration, one end of which is flared outwardly and flanged as at 161 to provide means whereby the cover member 159 may be secured upon the casing member 29 as by means of the fastening screws 163. The sleeve-like cover member 159 is provided with a pair of spaced apart partitions 165 and 167 defining a bearing-enclosing compartment 169 in the flared end of the same, an intermediate compartment 171 between the partitions 165 and 167 and an open ended compartment 173 in the outer end of the element 159. The shaft 141 extends through openings in the partitions 165 and 167 and contains an axial channel 175 having a radial opening 177 communicating the channel with the interior of the chamber 171. The channel 175 extends to and opens at the flanged end of the shaft which is secured to the end plate 55, said end plate having a radially extending channel 179 formed therein and opening at one end in communication with the inner end of the shaft channel 175. The outer end of the radial channel 179 opens on the inner face of the end plate 55 opposite the ring 53 and is connected with the cylinder inlet port 79 by means of a duct 181 formed in the ring 53.

It will be noted that, since the ring, the end plate, and the shaft 141 are all clamped together, there is no chance of leakage to or from the low pressure side of the compressor at any point in the inlet ducts 175, 179, and 181.

Fluid medium for compression is introduced into the chamber 171 through an opening 183 in the walls of the element 159, penetrates thence through the opening 177, into the shaft duct 175, and thence through the radial duct 179 and the inlet port 179 into the compression cylinder, whence, after compression, the work medium is expelled through the valved outlet port 81 into the interior of the housing 15, from whence the compressed medium may be drained off through an opening 185 formed in the walls of the casing.

The shaft opening in the partitions 165 and 167, defining the inlet compartment 171, are preferably sealed by means of annular seal rings. To this end, a seal ring 187 encircles the shaft within the bearing compartment 169 and is urged to sealingly seat upon the wall 167 around the shaft opening thereof by means of a spring 189, also encircling the shaft and engaging at its opposite ends respectively with the seal ring 187 and the facing end of the sleeve 151.

The outer end of the compartment 173 is preferably closed by a capping element 191 secured, as by means of the fastening studs 193, upon the outer end of the element 159. The capping element 191 comprises a wall portion containing an opening, through which the shaft 141 extends. Seal rings 195, which encircle the shaft portion between the wall 165 and the perforated wall portion of the capping element, are urged apart by means of the spring 197 so that the annular seal rings seat one upon the wall 165 around the shaft opening therein, and the other on the wall portion of the capping element at the shaft opening therein.

The capping element 191 has a cup-shaped portion 199 containing a bearing 201, which is held in place by means of a threaded collar 203 and a cover plate 205 is secured on the cup-shaped portion 199 in any suitable fashion as by means of the studs 207. The cover 205 preferably embodies an oil-retaining shaft seal 209, and means, comprising an opening 211, is provided to afford lubrication for the bearing 201.

Any suitable means may be employed to deliver a suitable lubricating medium in the chamber 169 and 173 for the purpose of lubricating the seals 155, 187, and 195, as well as the bearing 147. To this end, in the illustrated embodiment, the element 159 is formed with oil inlet openings 213, communicating with the chambers 169 and 173 and outlet openings 215 from said chambers. Oil may thus be circulated through the chambers from any suitable source, although I prefer to connect the inlet and outlet openings 213 and 215 in the oil return line 125, so that the lubricating medium, after passing through the compressor may be delivered through the compartments 169 and 173 before returning to the reservoir 121.

In order to provide for additionally cooling the compressor apparatus, the parts, defining the casing 15, may be formed with internal chambers 217, each of said internal chambers being formed with an inlet 219 and an outlet 221 whereby a suitable cooling medium, such as water, may be circulated through the chambers in order to abstract the heat of compression from the gases delivered into the casing through the valved outlet 81. In this way, the compressed gases may be cooled in order to maintain the apparatus at as low an operating temperature as possible. Suitable circulating means, either separate or built into the device, if desired, may be provided for the purpose of circulating the cooling medium through the chambers 217.

Apparatus, having in combination the various features herein described, is well adapted for the high compression of gaseous or other work media and I have been successful in maintaining unusually high pressures and low vacuums after many hundreds of hours of operation, using devices embodying the features herein described. I know of no rotary structure extant capable either of producing pressures in work medium comparable to the performance of devices embodying my present invention, or of maintaining such pressures over a long operating life. Devices embodying the present invention do not require unusual accuracy in manufacture and, in operation, are so well sealed that high pressure leakage is practically eliminated, thus permitting the development of exceptionally high discharge pressures as well as low vacuums. Such devices, moreover, are capable of adjustment to ensure satisfactory operation throughout their operating life, regardless of wear.

It is thought that the invention and numerous of its attendant advantages will be understood from the foregoing description and it is obvious that numerous changes may be made in the form, construction, and arrangement of the several parts of the illustrated apparatus without departing from the spirit or scope of my invention or sacrificing any of its attendant advantages, the preferred modes and forms herein described being merely for the purpose of illustrating the invention.

Having thus described my invention, what I claim as new and desire to secure by Letters Patent is as follows:

1. A rotary gas pressure device comprising a cylinder element and a cooperating piston element movably mounted eccentrically and tangentially to the inner surface of the cylinder and defining with the cylinder element a work space within the cylinder element, said elements having engageable relatively shiftable working surfaces, and means to deliver a liquid sealing medium between the engaging surfaces of the elements at a pressure greater than the maximum pressure developed in a fluid work medium in the work space, and adjustable means to regulate the pressure at which the sealing medium is so delivered.

2. A rotary gas pressure device comprising a cylinder element and a cooperating piston element movably mounted eccentrically and tangentially to the inner surface of the cylinder and defining with the cylinder element a work space within the cylinder element, said elements having engageable relatively shiftable working surfaces, and adjustable means to deliver a liquid sealing medium between the engaging surfaces of the elements whereby a pressure approximately ten per cent in excess of the maximum pressure developed in a fluid work medium within said work space may be maintained, in order to prevent escape of the work medium from the work space between the engaging surfaces of the elements.

WILLIAM W. WISHART.